United States Patent
Maj et al.

(10) Patent No.: US 11,299,564 B2
(45) Date of Patent: Apr. 12, 2022

(54) DIALKYL PEROXIDE COMPOSITION FOR MODIFYING THE RHEOLOGY OF POLYPROPYLENE IN MOLTEN STATE

(71) Applicant: ARKEMA FRANCE, Colombes (FR)

(72) Inventors: Philippe Maj, Brignais (FR); Martin Möllers, Günzburg (DE); Isabelle Tartarin, Lyons (FR)

(73) Assignee: Arkema France, Colombes (FR)

( * ) Notice: Subject to any disclaimer, the term of this patent is extended or adjusted under 35 U.S.C. 154(b) by 125 days.

(21) Appl. No.: 16/467,522

(22) PCT Filed: Dec. 15, 2017

(86) PCT No.: PCT/FR2017/053600
§ 371 (c)(1),
(2) Date: Jun. 7, 2019

(87) PCT Pub. No.: WO2018/109415
PCT Pub. Date: Jun. 21, 2018

(65) Prior Publication Data
US 2019/0359743 A1 Nov. 28, 2019

(30) Foreign Application Priority Data
Dec. 15, 2016 (FR) ........................................ 1662512

(51) Int. Cl.
*C08F 10/06* (2006.01)
*C08J 3/22* (2006.01)

(52) U.S. Cl.
CPC ............... *C08F 10/06* (2013.01); *C08J 3/226* (2013.01); *C08F 2810/10* (2013.01)

(58) Field of Classification Search
CPC .............................. C08K 5/14; C07C 407/006
See application file for complete search history.

(56) References Cited

U.S. PATENT DOCUMENTS 3,775,341 A * 11/1973 Barter ................. C07C 407/006
502/160
5,690,856 A * 11/1997 Milleville ........... C07C 407/006
252/186.26
2002/0091214 A1 * 7/2002 Waanders ........... C07C 407/006
526/229
2011/0118421 A1 * 5/2011 Waanders ................. C08F 4/28
525/387
2013/0213548 A1 * 8/2013 Natsuyama ............. C08L 23/08
156/60
2015/0218293 A1 * 8/2015 Tartarin ................... C08K 5/14
526/216
2019/0359743 A1 * 11/2019 Maj .......................... C08F 8/50

FOREIGN PATENT DOCUMENTS

| CN | 101389666 A | 3/2009 |
|----|----|----|
| CN | 102089332 A | 6/2011 |
| DE | 3032985 A1 | 4/1982 |
| EP | 1216991 A1 | 6/2002 |
| EP | 1231206 A1 | 8/2002 |
| EP | 1447404 A1 | 8/2004 |
| JP | 2005082711 A | 3/2005 |
| WO | 07096276 A1 | 8/2007 |
| WO | 2009071670 A1 | 6/2009 |
| WO | 10003887 A1 | 1/2010 |

OTHER PUBLICATIONS

Product Specification of Paraffin Oil. Chem-Supply Pty Ltd. Web: www.chemsupply.com.au. Evidentiary Reference. (Year: 2015).*
ISA/EP; International Search Report and Written Opinion for International Application No. PCT/FR2017/053600 dated Mar. 20, 2018, 11 pages.

* cited by examiner

*Primary Examiner* — Michael M Dollinger
(74) *Attorney, Agent, or Firm* — NK Patent Law

(57) ABSTRACT

The present invention relates to a liquid composition comprising at least one dialkyl peroxide, in liquid form at ambient temperature, at a content comprised within a range of from 75 to 77% by weight relative to the total weight of the composition, and at least one mineral oil with viscosity greater than 15 mPa·s, measured at a temperature of 10° C. and at a shear rate of 1000 s$^{-1}$.

Furthermore, the invention relates to the use of said composition to modify the melt rheology of the polypropylene.

12 Claims, No Drawings

DIALKYL PEROXIDE COMPOSITION FOR MODIFYING THE RHEOLOGY OF POLYPROPYLENE IN MOLTEN STATE

CROSS-REFERENCE TO RELATED APPLICATIONS

This application is a U.S. National Stage application of International Application No. PCT/FR2017/053600, filed on Dec. 15, 2017, which claims the benefit of French Patent Application No. 1662512, filed Dec. 15, 2016.

The present invention relates to a composition comprising at least one dialkyl peroxide, in liquid form at ambient temperature, comprising at least one solvent chosen among the mineral oils with viscosity greater than 15 mPa·s, measured at a temperature of 10° C. and a shear rate of 1000 s$^-$, preferably chosen among the paraffin oils.

The invention also relates to the use of the composition as defined above to modify the melt rheology, notably to reduce the melt viscosity, of the polypropylene.

The invention also relates to the use of one or more mineral oils having a viscosity greater than 15 mPa·s, measured at a temperature of 10° C. and at a shear rate of 1000 s$^{-1}$, to reduce the explosion intensity of a composition comprising at least one dialkyl peroxide at a content strictly greater than 70% by weight, in particular greater than 72% by weight, relative to the total weight of the composition.

Controlled preparation of polyolefin grades, i.e., obtaining various types of polymers with molecular weights, melt viscosities, densities, or specific molecular weight distribution that are adapted to various uses, can be achieved through the implementation of conventional methods, e.g. in extrusion or injection moulding processes.

Controlling the melt rheology of polyolefins, and more specifically their viscosity, can be done in particular during the extrusion or injection moulding step, in the presence of compounds capable of generating free radicals. Depending on the type of polyolefin prepared, for example polyethylene or polypropylene, a change in its melt rheology can result in an increase or decrease in its molecular weight.

More precisely, the use of compounds that can generate free radicals, such as organic peroxides and more particularly dialkyl peroxides, leads to a controlled degradation of the viscosity of the polypropylene.

Indeed, polypropylene is a polyolefin that is most often obtained by polymerising propylene monomers in the presence of catalysts during the Ziegler Natta reaction, followed by a controlled degradation step in the presence of dialklys which are added, in liquid or solid form, during an extrusion or injection moulding step at temperatures above 180° C. Under these operating conditions, the dialkyl peroxides then produce free radicals that will act to break the polypropane chains by triggering reactions known as beta-scission. Following such reactions, polypropylene with lower molecular weights will be obtained.

More specifically, controlled degradation of the polypropylene enables products to be obtained that have lower molecular weights, higher melt flow index and lower melt viscosity. This type of degradation is a visbreaking process.

The polypropylenes thus obtained have a controlled rheology and are of particular commercial interest as they can be used in many fields of application. Moreover, the method used to obtain them is easy to implement and permits to generate polypropylenes having a variety of mechanical properties.

However, organic peroxides, which are regularly used in the controlled degradation of the polypropylenes, are species that are generally highly unstable when heated. Indeed, in the event of an uncontrolled temperature increase, some organic peroxides may undergo auto-accelerated exothermic decomposition and risk igniting and/or violently exploding.

Such behaviour is thus notably incompatible with the regulations in force on the transport and storage of dangerous goods in plants in which polyolefins, and particularly polypropylene, are produced.

It is therefore particularly advantageous to formulate organic peroxides, especially dialkyl peroxides, in liquid form, in solvents (also referred to as phlegmatizers), i.e., in a diluted state, in order to reduce the potential danger thereof and to be able to safely store and transport them. The presence of a phlegmatizer or solvent also enables the violence of decomposition to be attenuated.

Furthermore, the advantage of the phlegmatized form can be the benefit of increased storage with regard to the amount of organic peroxide, due to the change of storage class according to the national regulations in force. This permits to store in production facilities a larger amount of organic peroxide when the peroxide is diluted in a solvent.

For example, pure 2,5-dimethyl-2,5-di(tert-butylperoxy)-hexane is classified UN 3103, i.e., type C, whereas when diluted to 50% by weight in a mineral oil, the product falls under UN class 3109, i.e., type F, in accordance with the UN Recommendations on the Transport of Dangerous Goods, 19$^{th}$ edition, 2015, in the section relating to organic peroxides. In the Dutch regulations on the storage of organic peroxides, PGS 8, version 1, 2011, the maximum size of the measuring equipment is 5,000 litres for a type F peroxide and 100 liters for a type C peroxide. Diluting thus enables a larger quantity of organic peroxide to be transported and stored, in larger containers.

By way of clarification, the aforementioned UN recommendations take account of the concentration at which the organic peroxide generates, in particular, (i) propagation of detonation, (ii) a more or less rapid deflagration under the effects of an initiation or combustion, as well as (iii) the intensity of the decomposition reaction of the peroxide during heating tests under confinement which can be violent, moderate, low or null.

These three criteria are the main and compulsory criteria that allow a product to be classified from type A to type H. They may be supplemented by other criteria for the most violent products (types B and C) or the least violent ones (types E and F).

A type F classification means that the product, in laboratory tests conducted in accordance with the UN methods set out in the Manual of Tests and Criteria of the UN Recommendations on the Transport of Dangerous Goods, 6$^{th}$ revised edition of 2015:

1) does not detonate in the cavitated state,
2) does not deflagrate,
3) shows a low or no effect when heated under confinement,
4) has low or no explosive power.

A product which meets the criteria for classification under type F may be packaged in IBCs or in tanks, in quantities of up to several tons. An additional test for sizing the emergency vent enables confirmation that the product can be transported in IBCs or tanks, in quantities of up to several tons.

An essential criterion to be considered in order to obtain a type F classification in accordance with the UN regulations is the intensity of the decomposition reaction of the organic peroxide during heating tests under confinement. In particular, the intensity of the decomposition reaction during these tests on a type F organic peroxide is low to null. These tests are described in the Manual of Tests and Criteria of the UN Recommendations on the Transport of Dangerous Goods, 6$^{th}$ revised edition of 2015.

In the prior art, the use of various types of additives has already been considered with a view to delaying the decomposition of organic peroxides, in particular for dialkyl peroxides.

By way of illustration, U.S. Pat. No. 5,155,192 describes the use of hydroperoxides, preferably a tertiary hydroxyperoxide, as solvents, to improve the suitability of peroxydicarbonate compositions for transport and storage.

Similarly, patent application WO 2002/092561 relates to the use of nitroxyl radicals, particularly N-heterocyclic compounds with the nitrogen atom bearing the nitroxyl radical, to thermally stabilise organic peroxides such as dialkyl peroxides, in order to increase the storage stability thereof.

The document EP 1231206 discloses the use of unsaturated dicarboxylic acids to improve stability during the manufacture, transport and storage of dialkyl peroxydicarbonate compositions.

Furthermore, it is also possible to formulate dialkyl peroxides, particularly 2,5-dimethyl-2,5-di(tert-butylperoxy)-hexane peroxide, with a maximum content of 70% by weight relative to the total weight of the composition, in isododecane in order to obtain a product with a type F classification in accordance with the UN recommendations previously described.

However, it was found that it was not possible to further increase the concentration in dialkyl peroxide in a composition comprising isododecane, i.e. beyond 70% by weight, without risking a downgrade of the type F classification established in accordance with the UN regulations. Indeed, the reaction to heating under confinement of such a composition in accordance with the UN tests is not "low" or "null" but "moderate" and can thus entail a risk of explosion. In other words, at a dialkyl peroxide content of more than 70% by weight, it is not possible to package the same quantity of composition under the same conditions (the packaging dimensions must therefore be reduced).

Moreover, in some applications, the presence of a large amount of solvent, in particular isododecane, can have, when using an organic peroxide based composition a certain number of drawbacks, such as solvent exudation, particularly when the organic peroxide is used in high-temperature extrusion processes, or potential exudation ("fogging") when using the polyproylene in which the organic peroxide is added.

Another drawback of this type of composition also arises from the possible presence of trace solvents in the polypropylenes eventually obtained by visbreaking. This leads to additional logistics and expenses in terms of implementation in order to separate the polypropylenes from the trace solvents.

Therefore, one of the purposes of the present invention is notably to propose dialkyl peroxide compositions with a content greater than 70% by weight whilst conforming to the type F classification in accordance with the UN regulations.

In other words, there is a genuine need to propose compositions with higher dialkyl peroxide concentration, without downgrading their type F classification in accordance with the UN regulations, so that these compositions can be transported and stored at least in the same safety conditions as conventional compositions comprising 70% by weight in dialkyl peroxide in isododecane.

In view of the foregoing, the purpose of the invention is notably to propose liquid dialkyl peroxide compositions that do not have the aforementioned drawbacks.

The present invention thus relates to a liquid composition comprising at least one dialkyl peroxide, in liquid form at ambient temperature, with a content greater than 72% by weight and strictly less than 80% by weight relative to the total weight of the composition, and at least one mineral oil with a viscosity greater than 15 mPa·s, measured at a temperature of 10° C. and a shear rate of 1000 s$^{-1}$.

The composition according to the invention shows low or no effect to heating under confinement.

The terms "low" effect and "no" effect correspond to a result that is likely to be obtained in the tests of heating under confinement, as defined in section 25 of the Manual of Tests and Criteria of the UN Recommendations on the Transport of Dangerous Goods, revised edition of 2015.

Preferably, the composition according to the present invention does not detonate in a cavitated state, does not deflagrate, shows low or no effect when heated under confinement, and has low or no explosive power.

All of the tests required to meet the aforementioned criteria are defined in sections 20 to 28 of the Manual of Tests and Criteria of the UN Recommendations on the Transport of Dangerous Goods referenced above.

More preferentially, the composition according to the present invention passes the classification tests for a type F organic peroxide, and yet more preferentially is within a type F classification as established in accordance with the UN recommendations. The composition according to the invention can therefore be safely transported and stored in polypropylene production facilities.

Type F classification means that, in laboratory tests conducted in accordance with the UN Manual of Tests and Criteria of the UN Recommendations on the Transport of Dangerous Goods, 6$^{th}$ revised edition of 2015, the product does not detonate in a cavitated state, does not deflagrate, shows low or no effect when heated under confinement, and has low or no explosive power.

The composition according to the invention has the advantage of enabling the concentration by weight in dialkyl peroxide to be increased with regard to a composition comprising 70% by weight in dialkyl peroxide in isododecane, without also downgrading the classification established by the UN regulations on transport and storage.

Thus the composition according to the present invention enables the concentration in dialkyl peroxide to be increased whilst ensuring a level of violence of decomposition, in tests of heating under confinement, that is less than or equal to that observed in a composition comprising 70% by weight of dialkyl peroxide in isododecane. In other words, the level of violence of decomposition in dialkyl peroxide is inferior or identical between the composition according to the invention and a composition comprising 70% by weight of dialkyl peroxide in isododecane.

Moreover, for the same concentration in dialkyl peroxide, the effects of the decomposition when heated under confinement are attenuated for the composition according to the invention with regard to a composition comprising dialkyl peroxide in isododecane.

Furthermore, the composition according to the invention permits to reduce the content of the solvent, which leads to a reduction in the logistic effort required to recover the polypropylenes obtained during the process aiming to modify the melt rheology thereof, in particular during visbreaking processes.

Moreover, the composition according to the invention enables the solvent exudation during extrusion to be limited.

The invention also relates to a composition according to the present invention packaged in a container, preferably a transport container, of at least 450 litres.

In other words, the invention also relates to a container, preferably a transport container, with a volume of at least 450 litres, containing a composition as defined above.

Preferably, said container has a volume of from 450 litres to 2000 litres, preferentially from 1000 to 1500 litres.

Preferably, said container is equipped with a vent for releasing gases.

Preferably, said container is made of plastic or metal, more preferentially in plastic.

The invention also relates to the use of the composition as defined above to modify the melt rheology of the polypropylene, preferably to modify the melt viscosity and/or its melt flow index.

Likewise, the present invention also relates to the use of one or more mineral oils with viscosity greater than 15 mPa·s, measured at a temperature of 10° C. and at a shear rate of 1000 s$^{-1}$, to reduce the explosion intensity of a composition comprising at least one dialkyl peroxide at a content strictly greater than 70% by weight relative to the total weight of the composition.

Other characteristics and advantages of the invention will be seen more clearly from the following description and examples.

In the following, and unless otherwise indicated, the limits of a range of values are included in this field.

The expression "at least one" is equivalent to the expression "one or more".

As indicated above, the composition according to the invention comprises at least one dialkyl peroxide, in liquid form at ambient temperature, with a content greater than 72% by weight and strictly less than 80% by weight, preferably from 73 to 79% by weight, preferably from 74 to 78% by weight, and yet more preferentially from 75 to 77% by weight, relative to the total weight of the composition.

Within the meaning of the present invention, dialkyl peroxide in liquid form at ambient temperature means a dialkyl peroxide in liquid form at a temperature comprised between 10° C. and 30° C., and preferentially between 15° C. and 25° C.

Dialkyl peroxide has the following classical empirical forms:

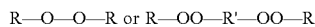

R—O—O—R or R—OO—R'—OO—R

The R or R' blocks can consist of aliphatic components, but also possibly of branches comprising aromatic or cyclic functions.

Preferably, the compounds belonging to the dialkyl peroxide family are chosen among 2,5-dimethyl-2,5-di(tert-butylperoxy)-hexyne-3 (Luperox® 130), ditert-butylperoxyde (Luperox® DI), ditert-amyl peroxyde (Luperox® DTA), 2,5-dimethyl-2,5(di(tert-butylperoxy)hexane (Luperox® 101), and mixtures thereof.

More preferentially, the dialkyl peroxide is the 2,5-dimethyl-2,5(di(tert-butylperoxy)hexane sold under the brand name Luperox® 101.

Advantageously, the content of the dialkyl peroxide(s) are present in a content of 77% by weight relative to the total weight of the composition according to the invention.

More advantageously, the content of the 2,5-dimethyl-2,5(di(tert-butylperoxy)hexane compound is at a content of about 77% by weight relative to the total weight of the composition according to the invention.

As an alternative, the content of the dialkyl peroxide(s) are present in a content of 75% by weight relative to the total weight of the composition according to the invention.

According to this alternative, the content of the 2,5-dimethyl-2,5(di(tert-butylperoxy)hexane compound is preferably at a content of about 75% by weight relative to the total weight of the composition according to the invention.

As indicated above, the composition according to the invention further comprises at least one mineral oil having a viscosity greater than 15 mPa·s, measured at a temperature of 10° C. and at a shear rate of 1000 s$^{-1}$.

The viscosity is measured at a temperature of 10° C. and at a shear rate of 1000 s$^{-1}$ with a Haake VT550 viscotester equipped with an NV rotor.

Within the meaning of the present invention, a mineral oil is a blend of saturated alkanes, cyclic or not, branched or not (e.g. isoparaffinic oils, naphthenic oils), aromatic derivatives, substituted or not (e.g. aromatic oils) and polyalphaolefins (more commonly referred to as PAOs) (e.g. synthetic oils). Mineral oil is liquid at atmospheric pressure and ambient temperature, i.e. at a temperature comprised between 10° C. and 30° C., preferentially between 15° C. and 25° C., and is insoluble in water.

Preferably, mineral oil has a viscosity of from 15 to 1000 mPa·s, preferably from 100 to 1000 mPa·s, preferably from 100 to 500 mPa·s, and yet more preferentially from 250 to 400 mPa·s, measured at a temperature of 10° C. and at a shear rate of 1000 s$^{-1}$.

Preferably, the mineral oil is chosen among the paraffin oils.

According to one embodiment, the composition according to the invention comprises the 2,5-dimethyl-2,5(di(tert-butylperoxy)hexane compound at a content of about 75% by weight relative to the total weight of said composition, and at least one mineral oil with viscosity of from 15 to 1000 mPa·s, measured at a temperature of 10° C. and at a shear rate of 1000 s$^{-1}$, preferably, a mineral oil chosen among the paraffin oils.

According to this embodiment, the mineral oil preferably has a viscosity of from 100 to 1000 mPa·s, preferably from 100 to 500 mPa·s, and yet more preferentially from 250 to 400 mPa·s.

The composition according to the invention can also comprise one or more functional additives intended to give special properties/characteristics to the polymer to which the peroxide is added.

Thus, the additive can be chosen among antioxidants; UV protection agents; processing agents, for the purposes of improving the final appearance when it is used, such as fatty amides, stearic acid and the salts thereof, ethylene bis (stearamide) or fluoro polymers; antifogging agents; antiblocking agents such as silica or talc; fillers such as calcium carbonate and nanofillers such as, for example, clays; coupling agents such as silanes; crosslinking agents such as peroxides; antistatic agents; nucleating agents; pigments; dyes; plasticizers; fluidizers and flame-retardant additives such as aluminium hydroxide or magnesium hydroxide.

The composition according to the invention can also optionally comprise additives including pH adjusting agents such as phosphate and citrate buffers; chelating agents; biocides such as fungicides; antiozonants; antioxidants, antidegradants; bulking agents and mould-release agents.

These additives can be added in the amounts usually used and known to those skilled in the art. These additives are usually used at contents comprised within a range of from 10 ppm and 10,000 ppm by weight relative to the final weight of the polymer. The plasticizers, fluidizers and flame-retardant additives can reach amounts well above 10,000 ppm.

The invention also relates to the use of the composition as defined above to modify the melt rheology of the polypropylene.

According to one embodiment, the composition is used to lower the melt viscosity and/or increase the flow index of the polypropylene.

Preferably, the composition according to the invention is used to lower the melt viscosity of the polypropylene.

Likewise, the composition according to the invention is used to increase the melt flow index of the polypropylene.

The melt flow index of the polypropylene is measured pursuant to the currently used methods to characterize thermoplastic materials in order to obtain information about extrudability as well as the forming possibilities of the material such as those described in ASTM D1238 or NF T 51-016.

Lastly, the present invention relates to a method for modifying the melt rheology of the polypropylene comprising a step of extrusion of the polypropylene at a temperature of between 140 and 300° C. and more particularly between 170° C. and 250° C., for a few seconds to a maximum of a few minutes in the presence of a composition as defined above.

Preferably, the method according to the invention is a visbreaking process of the polypropylene.

More preferentially, the visbreaking process of the polypropylene comprises a step of extrusion of the polypropylene at a temperature of between 140 and 300° C. and more particularly between 170° C. and 250° C., for a few seconds to a maximum of a few minutes in the presence of a composition as defined above.

Within the meaning of the present invention, "a few seconds to a few minutes" means from 3 seconds to 9 minutes, preferably from 10 seconds to 5 minutes, and yet more preferentially from 30 seconds to 2 minutes.

Advantageously, the composition comprises 77% by weight of the 2,5-dimethyl-2,5(di(tert-butylperoxy)hexane compound relative to the total weight of said composition.

More advantageously, the composition comprises 75% by weight of the 2,5-dimethyl-2,5(di(tert-butylperoxy)hexane compound relative to the total weight of said composition.

The polypropylene obtains is preferably a propylene homopolymer or propylene copolymer comprising at least one comonomer chosen among ethylene, 1-butene, 1-hexene and 1-octene.

More preferentially, the polypropylene is a propylene homopolymer or propylene copolymer mainly having units that are propylene derivatives.

Moreover, the invention also relates to the use of at least one mineral oil having a viscosity greater than 15 mPa·s, measured at a temperature of 10° C. and at a shear rate of 1000 s$^{-1}$, to decrease the explosion intensity of a composition comprising at least one dialkyl peroxide at a content strictly greater than 70% by weight, in particular greater than 71%, preferably greater than 72%, preferably greater than 73%, preferably greater than 74%, and preferentially greater than 75%, by weight, relative to the total weight of the composition.

"Explosion intensity" means the assessment of the violence of decomposition of the composition as measured during the heating of the composition under confinement, as described above, in accordance with the laboratory tests conducted in accordance with the UN methods set out in section 25 of the Manual of Tests and Criteria of the UN Recommendations on the Transport of Dangerous Goods, 6$^{th}$ revised edition of 2015.

The dialkyl peroxide present in the composition is as described above and is preferably the 2,5-dimethyl-2,5(di(tert-butylperoxy)hexane compound.

Preferably, the mineral oil described above is used to decrease the explosion intensity of a composition comprising at least one dialkyl peroxide at a content strictly superior to 70% and strictly inferior to 80%, by weight, relative to the total weight of the composition.

The following examples serve to illustrate the invention, without, however, being limiting in nature.

EXAMPLES

The composition according to the invention (A) and two comparative compositions (B) and (C) were prepared using the following raw materials:

A. Raw Material Used

The dialkyl peroxide used is 94.4% pure 2,5-dimethyl-2,5(di(tert-butylperoxy)hexane sold by ARKEMA under the brand name Luperox® 101.

B. Method used to Prepare the Compositions

Firstly, the 2,5-dimethyl-2,5(di(tert-butylperoxy)hexane was diluted in a white mineral oil with a viscosity of 321 mPa·s at 10° C., 1000 s$^{-1}$, to obtain:
  a composition comprising 77% by weight of dialkyl peroxide relative to the total weight of the composition (composition A according to the invention); and
  a composition comprising 71% by weight of dialkyl peroxide relative to the total weight of the composition (comparative composition B).

Then, the 2,5-dimethyl-2,5(di(tert-butylperoxy)hexane was diluted in isododecane with a viscosity of 1.7 mPa·s at 10° C., 1000 s$^{-1}$, to obtain:
  a composition comprising 71% by weight of dialkyl peroxide relative to the total weight of the composition (comparative composition C).

Viscosities were measured at a temperature of 10° C. with a Haake VT550 viscotester equipped with an NV rotor and at different shear rates. Viscosity at 1000 s$^{-1}$ was interpolated from the results with similar shear rates.

C. Comparative Tests

Comparative tests were conducted in accordance with UN methods E1 and E2 in the sections on organic peroxides of the Manual of Tests and Criteria of the UN Recommendations on the Transport of Dangerous Goods, revised edition of 2015.

The purpose of UN methods E1 and E2 is to determine the sensitivity of compositions (A), (B) and (C) when heated to high temperatures under defined confinement. These methods are defined in section 25, "Test Series E", of the UN Manual of Tests and Criteria, 6$^{th}$ revised edition.

The method UN E1 consists in rapidly heating a certain amount of product to be tested in a closed tube with a calibrated aperture in its upper portion. Based on the deformation of the tube, if any, or on the rupture diagram of the tube, the result is classified as "explosion" or "no explosion", for each test conducted. The tests were conducted at diameters increasing from 1 to 10 nm until 3 "no explosion" results were obtained for a given diameter. The limiting diameter recorded in the results is the largest diameter for which at least one test in three had an "explosion" result. Depending on the limiting diameter and on the deformation diagram of the tube, the effect is classified as "violent", "moderate", "low" or "null".

The method UN E2 consists in rapidly heating a certain amount of product to be tested in a closed tube with a calibrated aperture in its upper portion and a rupture disk with a burst pressure of 6 bars. The degree of sensitivity of a substance to heating under confinement in accordance with test UN E2 is expressed in limiting diameter.

The is the largest diameter, in mm, of the calibrated aperture for which the rupture disk burst in at least one test in three.

D. Results

The results are complied in the following tables:

1. Results according to method UN E1

| Composition | Concentration in organic peroxide | Solvent | Solvent viscosity (mPa·s) | Results for a diameter of 1 mm | 1.5 mm |
|---|---|---|---|---|---|
| C | 71% | Isododecane | 1.7 | Explosion | No explosion |
| A | 77% | White mineral oil | 321 | Explosion | No explosion |

*Measured at 10° C., 1000 s$^{-1}$

2. Results According to Method E2

| Composition | Concentration in organic peroxide | Solvent | Viscosity (mPa·s) | Limiting diameter in mm |
|---|---|---|---|---|
| C | 71% | Isododecane | 1.7 s$^{-1}$ | 2 |
| B | 71% | White mineral oil | 321 | 1 |
| A | 77% | White mineral oil | 321 | 2 |

The tests conducted on heating under confinement resulted in a "low" intensity of the decomposition of the dialykyl peroxide, for the three products tested in accordance with the UN recommendations.

These results, as a supplement to other tests, led to the classification by the BAM ("Bundesanstalt für Materialforschung und -prüfung") classification of the three products tested as type F for transport and storage pursuant to the UN classification.

Moreover, the use of a solvent having a high-viscosity enables to reduce the violence of decomposition, for an identical concentration, or, for the same degree of violence of decomposition in the test of heating under constraint, to substantially increase the concentration in active material.

Dialkyl peroxide composition for modifying the rheology of polypropylene in molten state.

The present invention relates to a liquid composition comprising at least one dialkyl peroxide, in liquid form at ambient temperature, at a content comprised within a range of from 75 to 77% by weight relative to the total weight of the composition, and at least one mineral oil with viscosity greater than 15 mPa·s, measured at a temperature of 10° C. and at a shear rate of 1000 s$^{-1}$.

Furthermore, the invention relates to the use of said composition to modify the melt rheology of the polypropylene.

The invention claimed is:

1. A liquid composition comprising at least one dialkyl peroxide, in liquid form at ambient temperature, with a content greater than 72% by weight and strictly less than 80% by weight, relative to the total weight of the composition, and at least one mineral oil with viscosity greater than 15 mPa·s, measured at a temperature of 10° C. and a shear rate of 1000 s$^{-1}$.

2. The composition according to claim 1, wherein the dialkyl peroxide is selected from the group consisting of 2,5-dimethyl-2,5-di(tert-butylperoxy)-hexyne-3, ditert-butylperoxide, ditert-amyl peroxide, 2,5-dimethyl-2,5(di(tert-butylperoxy)hexane, and mixtures thereof.

3. The composition according to claim 1, wherein the dialkyl peroxide comprises 2,5-dimethyl-2,5(di(tert-butylperoxy)hexane.

4. The composition according to claim 1, wherein the content of the dialkyl peroxide is comprised within a range of from 73 to 79% by weight, relative to the total weight of the composition.

5. The composition according to claim 1, wherein the mineral oil has a viscosity of from 15 to 1000 mPa·s, measured at a temperature of 10° C. and at a shear rate of 1000 s−1.

6. The composition as claimed in claim 1, wherein the mineral oil is chosen among the paraffin oils.

7. The composition as claimed in claim 1, wherein the composition shows a low or no effect when heated under confinement.

8. A method for modifying a melt rheology of a polypropylene comprising extruding the polypropylene at a temperature of between 140 and 300° C., for a few seconds to a maximum of a few minutes in the presence of the composition of claim 1.

9. The method according to claim 8, of visbreaking the polypropylene.

10. The method according to claim 8, wherein the melt flow index of the polypropylene is increased.

11. The method according to claim 8, wherein the polypropylene comprises a propylene homopolymer or propylene copolymer comprising at least one comonomer selected from the group consisting of ethylene, 1-butene, 1-hexene and 1-octene.

12. A method of decreasing the explosion intensity of a composition comprising at least one dialkyl peroxide in a content strictly greater than 70% by weight, relative to the total weight of the composition, comprising introducing at least one mineral oil with viscosity greater than 15 mPa·s, measured at a temperature of 10° C. and at a shear rate of 1000 s$^{-1}$.

* * * * *